United States Patent [19]
Saito et al.

[11] Patent Number: 5,954,776
[45] Date of Patent: Sep. 21, 1999

[54] HYDRAULIC CONTROL APPARATUS OF AUTOMATIC TRANSMISSION

[75] Inventors: Masao Saito; Masaharu Chiba; Masayuki Kuwata; Masatoshi Taguchi; Kenji Suzuki; Hiroshi Tsutsui, all of Anjo, Japan

[73] Assignee: Aisin AW Co., LTD., Japan

[21] Appl. No.: 08/909,888

[22] Filed: Aug. 12, 1997

[51] Int. Cl.$^6$ .................................................... G06F 17/00
[52] U.S. Cl. ............................ 701/51; 701/55; 701/64; 477/34; 477/43; 477/115; 477/118
[58] Field of Search ........................ 701/51–66; 477/34, 477/43, 115–8, 156; 475/3, 125–8, 63

[56] References Cited

U.S. PATENT DOCUMENTS 4,485,695  12/1984  Kawamoto ............................. 477/130
5,267,491  12/1993  Sumimoto et al. ..................... 477/155

*Primary Examiner*—William A. Cuchlinski, Jr.
*Assistant Examiner*—Yonel Beaulieu
*Attorney, Agent, or Firm*—Lorusso & Loud

[57] ABSTRACT

A hydraulic control unit of an automatic transmission calculates deceleration during a coasting downshift, and calculates a piston play offsetting time, that is, the lag time that elapses between a shift decision and the start of the shift, on the basis of a correction value determined in accordance with the lag time learned from the previous shift. Based on the rate of deceleration and the piston play offsetting time, the downshift line in the speed shift map is corrected, that is, advanced in timing. Using this timing-advanced shift line, the control unit makes an earlier shift decision such that the shift starts in a proper state of operation, thus reducing shift shock during a coasting downshift and preventing excessive engine speed during a high-speed upshift.

31 Claims, 9 Drawing Sheets

| Shift Operation / Fluid Temperature | 1ST (Initial Value) | 2ND | 3RD | ... | | | |
|---|---|---|---|---|---|---|---|
| 0~80 | T1A | T2A | T3A | | | | |
| 80~100 | T1B | T2B | T3B | | | | |
| 100~120 | T1C | T2C | T3C | | | | |
| ... | | | | | | | |

Calculated Data (T1A–T1C, T2A–T3C)

Piston Play Offsetting Time Data — Fluid Temperature

HYDRAULIC CONTROL APPARATUS OF AUTOMATIC TRANSMISSION

BACKGROUND OF THE INVENTION

1. Field of the invention

The invention relates to a hydraulic control apparatus of an automatic transmission installed in a motor vehicle and, more particularly, to a hydraulic control apparatus for controlling lag time that elapses between a shift decision and the actual start of the shift.

2. Description of the Related Art

A typical automatic transmission automatically makes a shift decision (determination) in accordance with a predetermined speed shift map based on the vehicle speed and the throttle opening. Responsive to the shift decision, the automatic transmission supplies a predetermined oil pressure to or drains oil pressure from hydraulic servos for operating clutches or brakes (frictional engagement elements), thus changing the torque transmission path through a multi-speed shift gear mechanism to accomplish the shift.

The shift map is prepared so that the vehicle speed at which a downshift is to be performed decreases as the throttle opening decreases. However, if the vehicle speed rapidly decreases as in full braking, the vehicle speed may fall to a speed equal to or less than the vehicle creep speed of the current gear ratio (pre-shift speed) during an oil pressure response lag time between a shift decision (shift instruction) and the actual shift. If a downshift is effected during coasting, i.e. the drive state is changed from non-driven to driven, a shift shock occurs.

A conventional hydraulic control apparatus of an automatic transmission is disclosed, for example, in Japanese patent Laid-Open application ("Kokai") No. HEI 4-78370, and includes vehicle speed changing rate calculating means for calculating the vehicle speed changing rate from vehicle speed information and, if the throttle opening is equal to or less than a predetermined value and the vehicle speed changing rate is equal to or greater than a predetermined value, controls the speed shift by correcting the vehicle speed value predetermined for a downshift in a speed shift map, i.e. that predetermined vehicle speed is increased by a predetermined amount.

This conventional apparatus can prevent the vehicle speed during a downshift from falling to or below the creep vehicle speed of the current gear stage (gear ratio), even though oil pressure response lag occurs between the time of a shift decision and the time of the actual shift (as in full braking), thus reducing shift shock.

The above-described conventional apparatus does not correct a shift point in the speed shift map unless the throttle opening is equal to or less than the predetermined value and the vehicle speed changing rate (deceleration rate) is equal to or greater than the predetermined value. However, even when the deceleration rate is equal to or less than the predetermined value, a shift shock can be caused by changeover of the drive state during a shift.

The conventional apparatus also has a drawback with upshifts. For example, if an upshift is performed during acceleration from a high vehicle speed, the engine speed may rise to or above an allowable speed limit during the shift, thus increasing wear of the engine.

SUMMARY OF THE INVENTION

Accordingly, it is an object of the invention to provide a hydraulic control apparatus for an automatic transmission that solves the above-described problems, that is, one that constantly provides optimal shift control by controlling the lag time that elapses between a shift decision and actual start of the shift, (start of a change in rotational speed) in accordance with the speed changing rate.

According to the invention, there is provided a hydraulic control apparatus for an automatic transmission, comprising: a control unit that receives signals from sensors which detect various vehicle running conditions and that includes a speed-shift map; a hydraulic circuit for controlling supply and draining of oil pressure to/from a plurality of hydraulic servos; and a multi-speed shift gear mechanism that performs speed shift by changing the torque transmission path using frictional engagement elements that are engaged and released by the hydraulic servos. The control unit makes a shift decision based on a shift line on the speed-shift map, so that the oil pressure supply to a predetermined hydraulic servo in the hydraulic circuit is switched to change the torque transmission path in the multi-speed shift gear mechanism. The control unit comprises: speed changing rate calculating means for calculating the speed changing rate; and lag time control means for controlling the lag time between the shift decision and start of the actual speed shift, i.e. controls the timing of start of oil pressure supply to the predetermined hydraulic servo, in accordance with the speed changing rate calculated by the speed changing rate calculating means, so that the shift start timing becomes a target value.

Thus, the hydraulic control apparatus of the invention is able to always start a shift with an optimal, targeted timing, by controlling the lag time, which is independent from the speed change, in accordance with the speed changing rate.

It is preferred that the lag time control means include shift line correcting means for correcting the shift line on the speed-shift map in accordance with the speed changing rate. The hydraulic control apparatus is thereby able to start a shift at the proper time through a rather simple change in the hydraulic control means.

It is also preferred that the lag time control means include oil pressure correcting means for correcting the oil pressure supply to the hydraulic servo in accordance with the speed changing rate so that the hydraulic control apparatus is able to start a shift when proper simply by suitably controlling liner solenoid valves or the like, without need to correct the speed-shift map.

Preferably, the shift line correcting means corrects the downshift line for the shift determination during a coasting downshift. By correcting the downshift line in accordance with the deceleration (speed reducing rate), the hydraulic control apparatus is able to start a shift when proper in any coasting downshift, thus preventing a changeover of the drive state and excessively strong engine braking and preventing shift shocks.

The shift line correcting means also preferably corrects the upshift line for the shift determination during an upshift. By correcting the upshift line in accordance with the acceleration (speed increasing rate), the hydraulic control apparatus is able to prevent an upshift delay and thereby prevent an undesirable rise of the engine speed, thus reducing wear of the engine which would otherwise be caused by overly high engine speed.

The lag time is preferably calculated with a correction based on the actual lag time learned in the previous speed shift. The hydraulic control apparatus is thus able to always set a proper lag time based on current information by eliminating the influence of deterioration with age.

Preferably, the lag time is set by learning based on an accumulated lag time actually experienced. The hydraulic control apparatus is thereby able to always set a proper lag time by eliminating the influence of disturbances caused by unusual conditions.

In another preferred embodiment, the lag time is set based on data corresponding to oil viscous resistance. By fine setting of the lag time in this manner, the hydraulic control apparatus is able to improve the precision achieved by the aforementioned learning and also to set a proper lag time even in a case where the data is read out directly from the memory.

It is further preferred that the data corresponding to oil viscous resistance be values of oil temperature. By finely setting the lag time in this manner, the hydraulic control apparatus is able to improve the precision achieved by the aforementioned learning and is also able to set a proper lag time even by use of data read out directly from the memory.

Operation of the invention will now be briefly described. If the rate of deceleration (vehicle speed changing rate) is high, as in full braking or the like, the apparatus of the invention corrects a downshift line so as to give an earlier shift decision or increases the oil pressure supply to the currently operating hydraulic servos in accordance with the deceleration, to control the lag time, including a piston play offsetting time, so that the shift will start at an appropriate, targeted time. The apparatus thereby starts the shift immediately before the input shaft speed becomes lower than the engine speed, thus providing a smooth shift without a change in the drive state.

If the rate of acceleration (speed changing rate) is high, for example, in the case of an upshift during acceleration from a high speed, the apparatus corrects an upshift line to provide for an earlier shift decision or increases the oil pressure supply to the currently operating hydraulic servos in accordance with the acceleration, to control the lag time. The automatic transmission thereby effects an upshift and thus reduces the engine speed before the engine speed increases beyond a normal engine speed range.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF PREFERRED EMBODIMENTS

Preferred embodiments of the invention will now be described in detail with reference to the accompanying drawings.

The automatic transmission controlled according to the present invention will have the usual automatic shift mechanism (not shown) which includes many frictional engagement elements, such as clutches and brakes. By properly engaging and disengaging the frictional engagement elements, the automatic transmission changes the transmission path through a multi-speed shift gear mechanism comprising planetary gears and the like. The input shaft of the automatic shift mechanism is connected to the output shaft of an engine by a torque converter. The output shaft of the automatic shift mechanism is connected to drive wheels.

Figure 1:
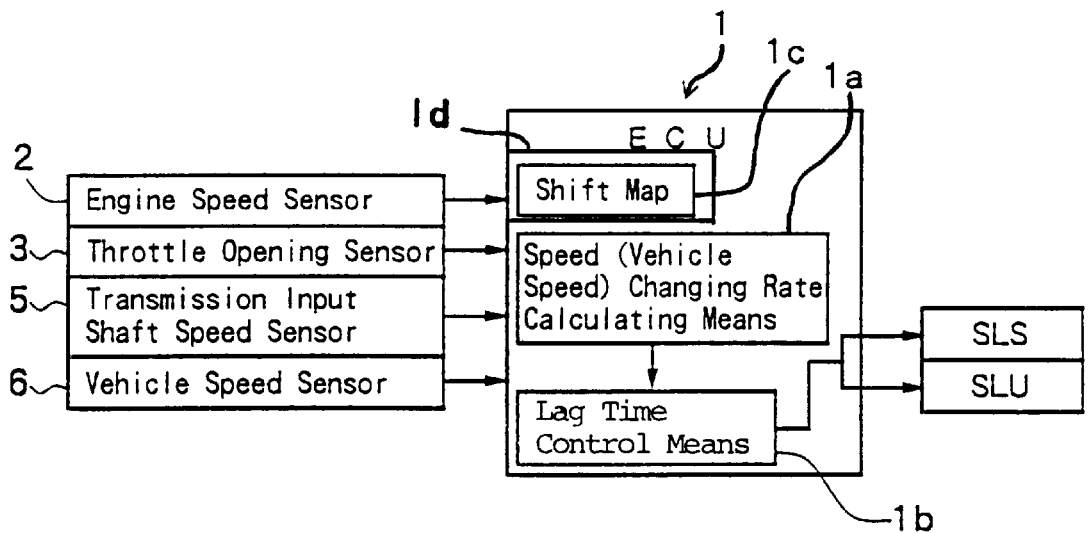
FIG. 1 is a block diagram illustrating the electronic portion of the control apparatus of an embodiment of the present invention.

FIG. 1 is a block diagram illustrating the electronic control portion of the controller of the present invention. A control unit 1 in the form of a microprocessor receives signals from an engine speed sensor 2, a throttle opening sensor 3, a transmission input shaft speed (=turbine speed) sensor 5, and a vehicle speed (=automatic transmission output shaft speed) sensor 6. The control unit 1, in turn, outputs control signals to linear solenoid valves SLS, SLU of a hydraulic circuit. The electronic control unit 1 includes a memory 1d, a shift map 1c stored in memory 1d, means 1a for calculating a speed change per unit time, that is, a speed changing rate (vehicle speed changing rate), based on signals from the vehicle speed sensor 6 (or the input shaft speed sensor 5), and lag time control means, such as (1) shift line correcting means for correcting a shift line of the shift map in accordance with the vehicle speed changing rate or (2) means for changing oil pressure supply so as to change a time set for offsetting the play of the servo pistons, that is, a piston lost motion time, in accordance with the vehicle speed changing rate.

Figure 2:
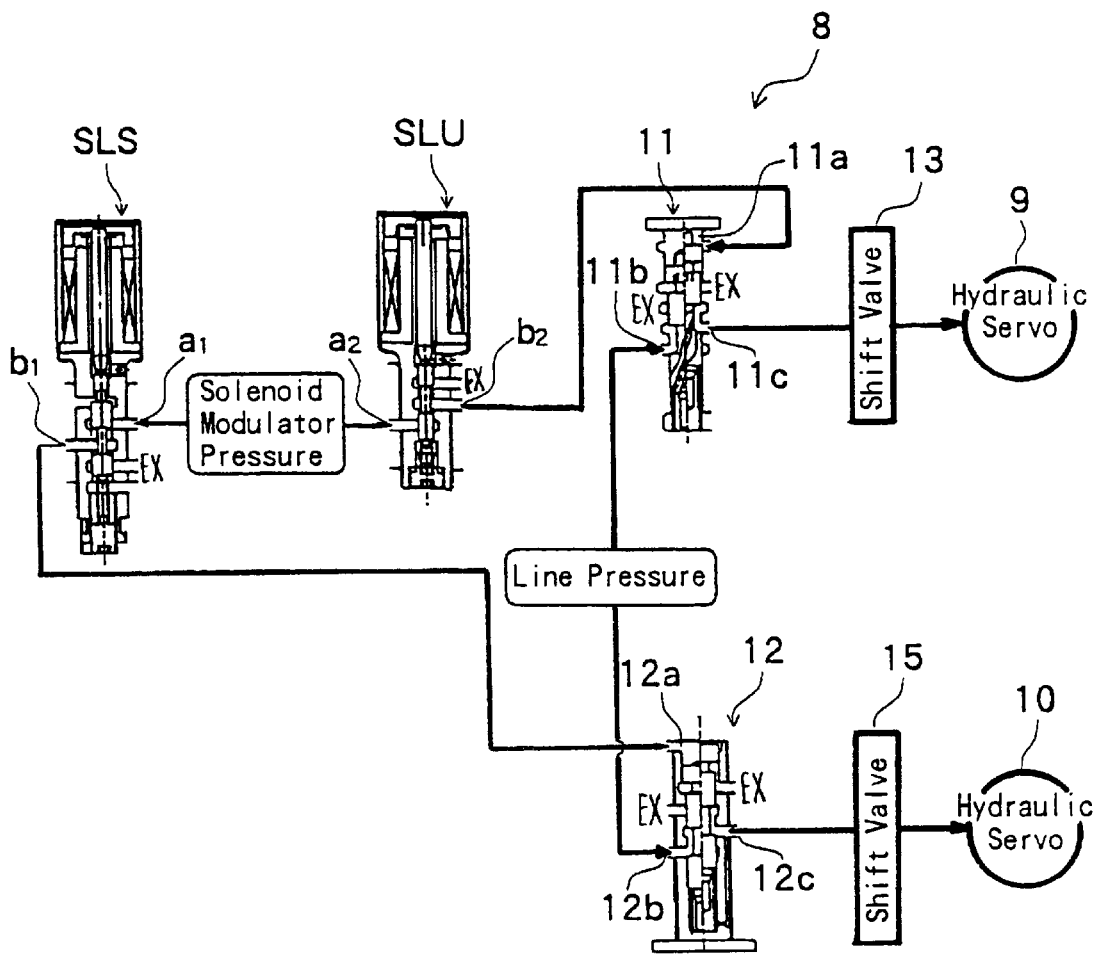
FIG. 2 schematically illustrates the hydraulic circuit portion of one embodiment of the present invention.

FIG. 2 schematically illustrates a hydraulic circuit 8 comprising the two linear solenoid valves SLS, SLU and a plurality of hydraulic servos 9, 10 for engaging and disengaging a plurality of friction engagement elements (clutches and brakes) that change the torque transmission path through planetary gear sets of the automatic shift mechanism, to provide five forward speeds and one reverse speed. Input ports $a_1$, $a_2$ of the linear solenoid valves SLS, SLU are supplied with solenoid modulator pressure. The linear solenoid valves SLS, SLU supply control pressure from their output ports $b_1$, $b_2$ to control pressure chambers 11a, 12a of pressure control valves 11, 12. Input ports 11b, 12b of the pressure control valves 11, 12 are supplied with line pressure. The regulated pressure, which is changed in accordance with the control pressure, is supplied from output ports 11c, 12c of the pressure control valves 11, 12 to the corresponding hydraulic servos 9, 10 via shift valves 13, 15, respectively.

The above-described hydraulic circuit 8 is intended merely to illustrate the basic structure, and the hydraulic servos 9, 10 and the shift valves 13, 15 are shown merely for illustration. In actual practice, the hydraulic circuit will include many hydraulic servos corresponding in number to the type of automatic shift mechanism and, therefore, many shift valves for switching oil pressure supply to the hydraulic servos.

Figure 3:
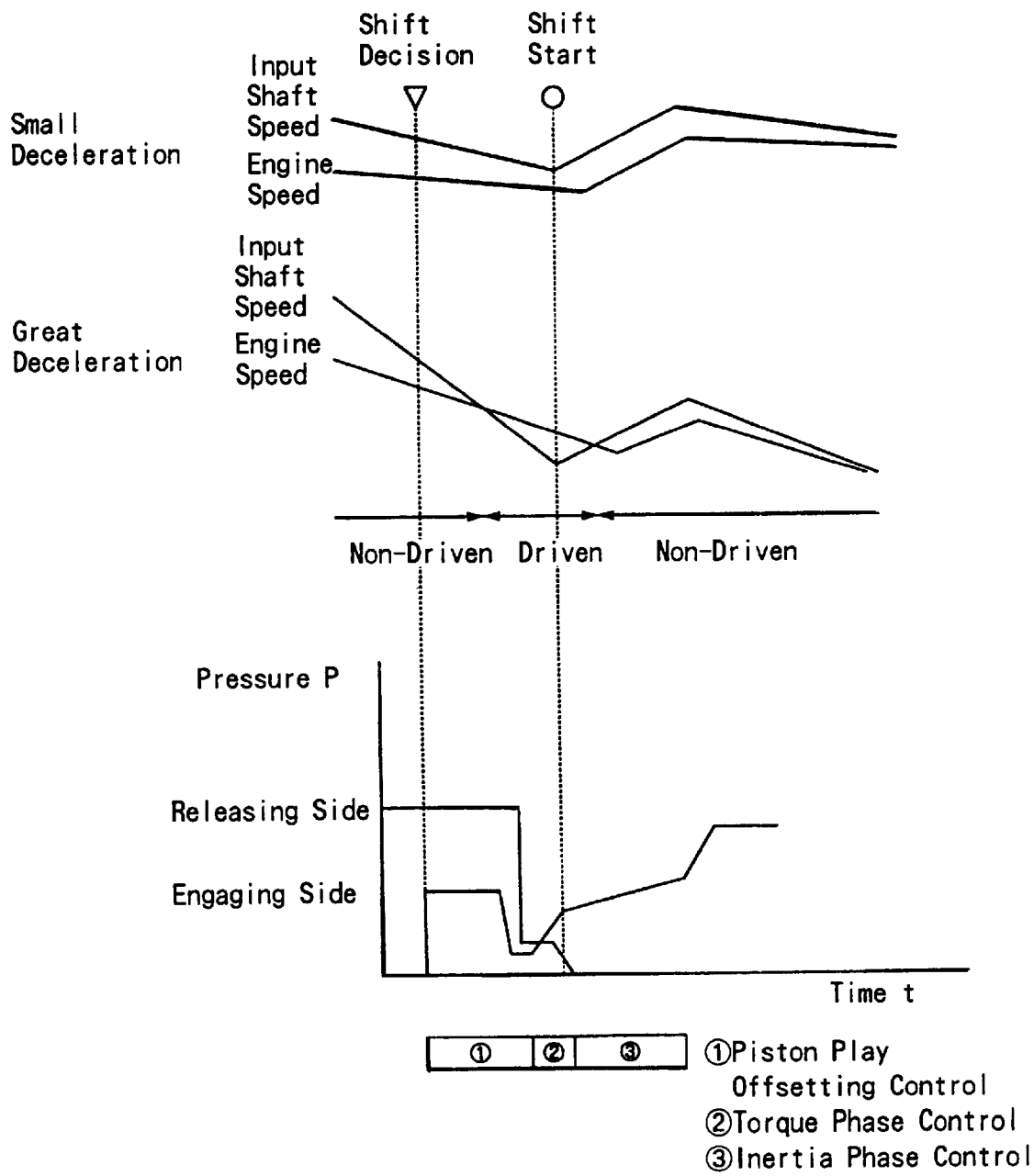
FIG. 3 is a graph of the parameters of engine speed and servo pressure versus time in a coasting downshift.

A "coasting downshift", as the term is used herein, has reference to a downshift that is performed by the automatic shift mechanism, in accordance with the shift map, when a driver releases the accelerator pedal and reduces the vehicle speed in the D range or the like, without operating the shift lever, either with or without depression of the brake pedal. FIG. 3 illustrates a coasting downshift in accordance with the present invention.

When a downshift line in the shift map 1c, stored in a ROM of the control unit 1, for example the 3-2 downshift line, is crossed, the control unit 1 outputs a shift decision signal. The downshift (for example, the 3-2 downshift) is accomplished by releasing a fourth brake (B4) and engaging a fifth brake (B5). Responsive to the shift decision signal, a predetermined oil pressure (servo piston play offsetting pressure) is immediately supplied to the engaging-side hydraulic servo (for example, the hydraulic servo 10). Thereby the piston of the hydraulic servo is thereby moved to a position slightly short of the position where the piston contacts the frictional engagement element (B5) for engagement of that element with torque transmission therethrough. During this piston play offsetting operation, the oil pressure on the releasing-side hydraulic servo (for example, the hydraulic servo 9) is maintained at a pressure that holds the frictional engagement element (B4) in engagement. This control operation is referred to herein as "piston play offsetting control" (1).

Subsequently, as the releasing oil pressure is relieved, the engaging oil pressure is increased with a predetermined sweep angle to effect torque phase control (2). This torque phase control maintains the transmission of torque by the releasing-side frictional engagement element, and gradually increases the torque transmission by the engaging-side frictional engagement element, so that the torque allotment ratio changes without a rotational speed change. Then, when the transmission torque capacity of the engaging-side frictional engagement element increases so that the input shaft rotational speed changes (that is, the shift starts), inertia phase control (3) is started. The inertia phase control sweeps up the engaging oil pressure with a small gradient, and drains the releasing oil pressure so that the releasing-side frictional engagement element is released.

The releasing oil pressure control is performed by the linear solenoid valve SLU which operates in response to a signal from the control unit 1. The control pressure from the linear solenoid valve SLU, in turn, regulates the pressure on the pressure control valve 11. The engaging oil pressure is controlled by the linear solenoid valve SLS responsive to a signal from the control unit 1. The control pressure from the linear solenoid valve SLS regulates the pressure control valve 12. Thus the releasing-side oil pressure and the engaging-side oil pressure are regulated and controlled by electric signals from the control unit.

If a coasting downshift is performed when the rate of deceleration (speed reducing rate) is low, as when the brake pedal is lightly depressed or left undepressed, the rates of engine speed input shaft speed reduction are low during the piston play offsetting control (1) and during the torque phase control (2), and the non-driven state, wherein the input shaft speed is greater than the engine speed, exists at the time of the shift start, that is, at the beginning of the inertia phase. The downshift is thus performed in a non-driven state. However, if there is a great difference between the input shaft speed and the engine speed at the time of a shift start, a strong engine braking effect results, causing a shock.

Conversely, if the rate of deceleration (speed reducing rate) is high, as when the brake pedal is strongly depressed, the rate of reduction of the input shaft speed becomes significantly greater than rate of reduction of the engine speed, so that a state is reached wherein the input shaft speed is lower than the engine speed, i.e. the driven state wherein the engine torque is transmitted to the wheels, during the piston play offsetting control (1) or during the torque phase control (2), which precede the time of the shift start. Thus the downshift converts from the driven state to the inertia phase wherein the input shaft speed increases because of the shift of the automatic shift mechanism to a lower gear speed (e.g. 3rd to 2nd), thus bringing about the non-driven state again. This switching of the transmission state during a coasting downshift, from the non-driven state to the driven state and then back to the non-driven state, causes shocks that the driver can feel.

Therefore, it is desirable to start a downshift immediately before the input shaft speed becomes lower than the engine speed (at the target timing). Although the above description is based on a so-called clutch-to-clutch shift, such as the 3rd-2nd downshift, where one frictional engagement element becomes released and another frictional engagement element becomes engaged, the coasting downshift control of the present invention is also applicable to a downshift using a one-way clutch and to a jump downshift such as the 3rd to 1st shift.

Figure 4:
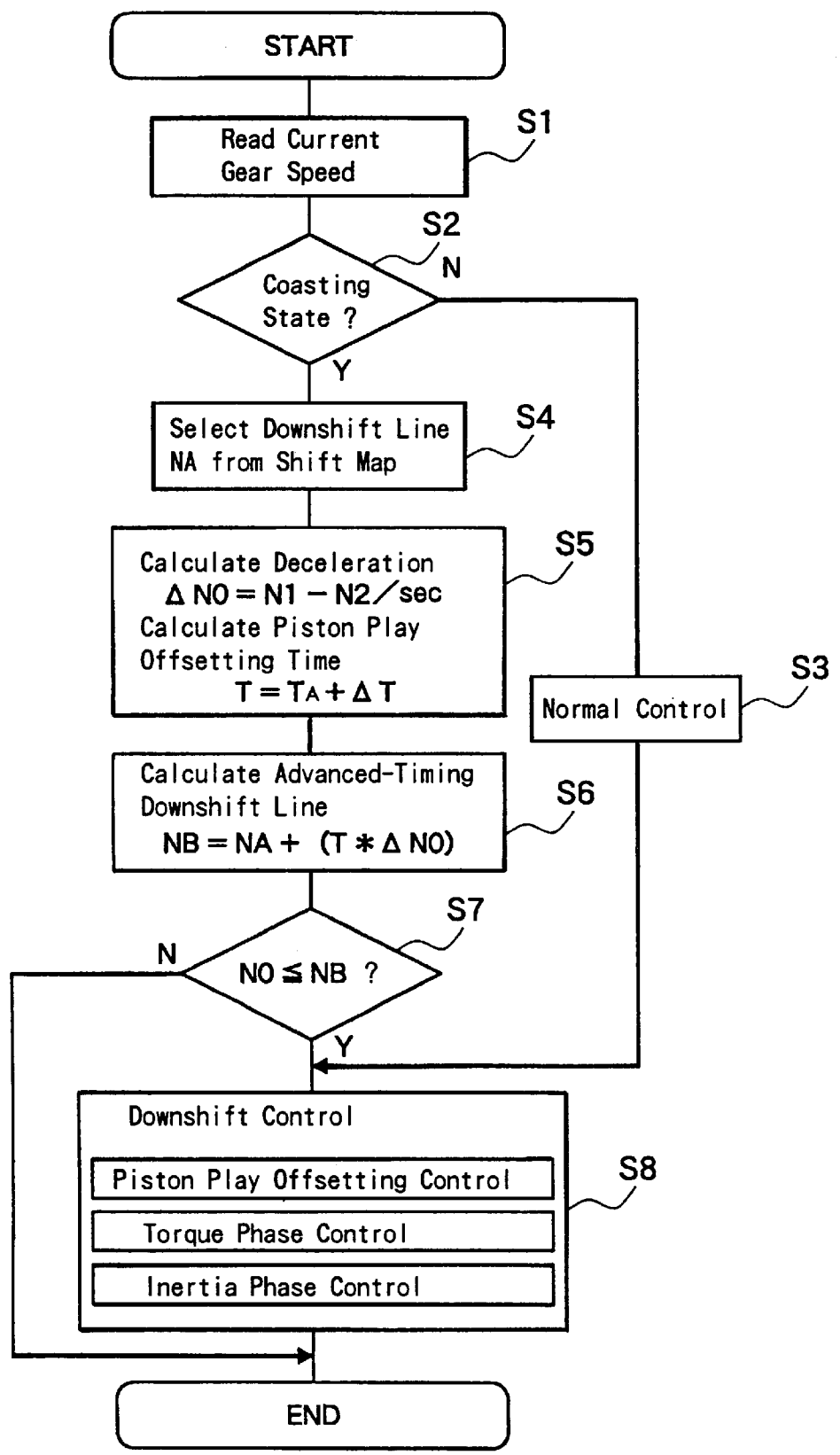
FIG. 4 is a flowchart of a control routine for a coasting downshift.

A first embodiment of the invention will be described with reference to the coasting downshift flowchart of FIG. 4. The control starts with reading a gear speed, for example, the 3rd speed, currently maintained by the automatic shift mechanism (S1). Then the control unit 1 determines whether the running state is a coasting state, that is, whether the engine speed is lower than the input shaft speed (S2). If the coasting state does not exist, for example, when the accelerator pedal is depressed for acceleration (a torque demand), the control is performed in a normal mode according to the shift map (S3). If coasting is determined, the control unit 1 performs the lag time control according to the present invention.

Figure 5:
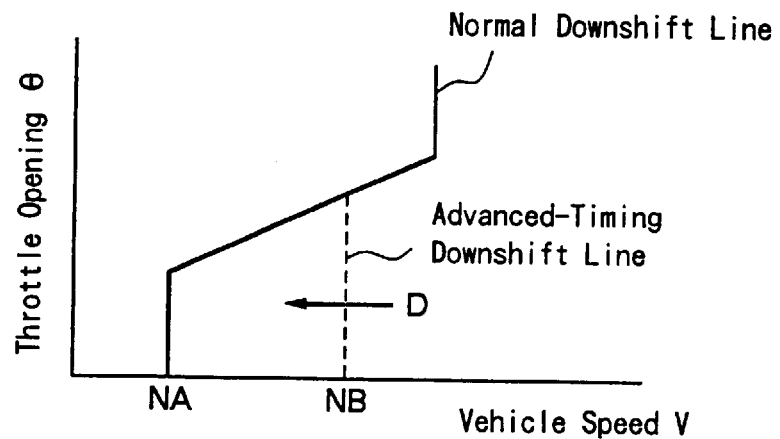
FIG. 5 illustrates a portion of a shift map used in the control routine illustrated in FIG. 4.

In the lag time control, the control unit 1 selects a downshift line NA, as shown in FIG. 5, from a shift map stored in the ROM of the control unit 1, on the basis of the current throttle opening θ and the current vehicle speed V (S4). The selected downshift line NA is the same as the downshift line that would have been selected from the shift map for the normal-mode control. Then, based on the signal from the vehicle sensor 6 (or the input shaft speed sensor 5), the control unit 1 calculates the rate of deceleration (output shaft speed change) ΔN0 from the difference between the detected output shaft speed N1 and the output shaft speed N2 occurring a predetermined time before (for example, one cycle before) (ΔN0=N1−N2/sec) (S5). The control unit 1 also calculates a piston play offsetting time T based on the length of time $T_A$ for the piston play offsetting control (1), separately determined for this particular automatic shift mechanism, and calculates a correction value ΔT corresponding to the time elapsing between the shift decision and the end of the torque phase during the previous downshift (T=$T_A$+ΔT) (S5).

Then, the control unit 1 calculates vehicle speed (output shaft speed) NB based on (1) an advanced-timing downshift line calculated from the vehicle speed (output shaft speed) NA which, in turn, is based on the normal downshift line selected from the shift map, (2) the calculated piston play offsetting time T and (3) the calculated deceleration ΔN0: NB=NA+(T×ΔN0) (S6). If the output shaft speed N0 detected by the vehicle speed sensor 6 becomes lower than the output shaft speed NB based on the calculated downshift line (S7), that is, crosses the calculated downshift line as indicated by arrow D in FIG. 5, the downshift control is performed as described above (S8). That is, the downshift is performed by the piston play offsetting control (1), the torque phase control (2) and the inertia phase control (3) as indicated in FIG. 3.

Therefore, even if the rate of deceleration is high as in full braking, the control unit 1 advances the downshift line in time in accordance with the rate of deceleration, so that a shift decision is made at a relatively high vehicle speed (output shaft speed). The shift determination made in this manner adjusts the shift start timing, which is preceded by the lag time period including the piston play offsetting time and the torque phase control time, to a time (target value) immediately before the input shaft speed becomes lower than the engine speed (the non-driven state). The coast downshift control thus provides a smooth shift operation without shift shock.

Figure 6:
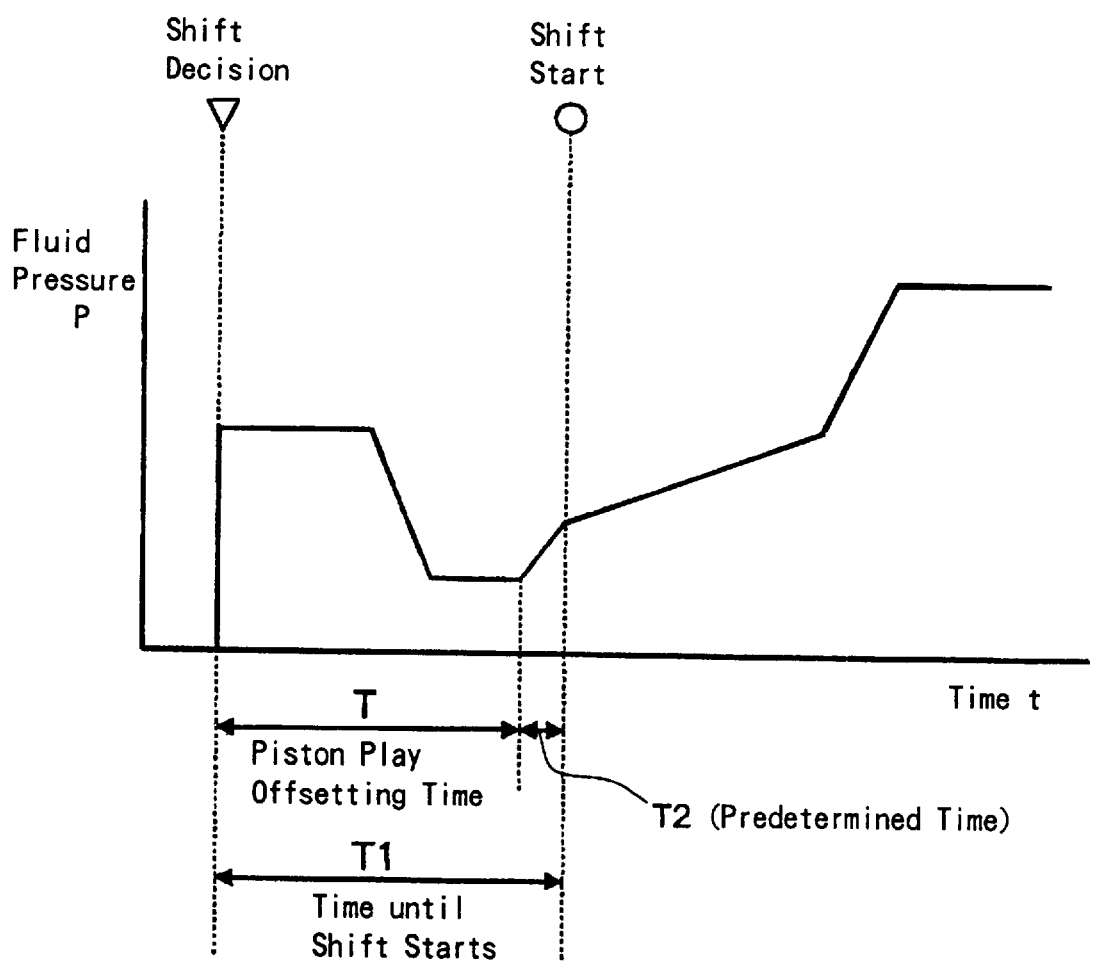
FIG. 6 is a graph of servo pressure versus time indicating the time for offsetting the piston play.

The setting of the piston play offsetting time T will now be described with reference to FIG. 6. The control unit 1 calculates the time T1 that elapses between the shift decision and the time of the shift start determined as a predetermined speed change (increase) detected by the input shaft speed sensor 5. The piston play offsetting time T is calculated by subtracting from the time T1 a pre-set torque phase control time T2 (T=T1−T2). A correction value ΔT is set in accordance with the actual piston play offsetting time T, and used in step S5 to determine a piston play offsetting time for the next shift operation. As for the torque phase control time T2, since the upsweep angle is controlled during the torque phase on the basis of the input torque so that the shift start state will be achieved in a predetermined time, the time T2 is a predetermined time independent of the input torque and the like. The piston play offsetting time $T_A$ is roughly predetermined for each individual automatic shift mechanism.

Figure 7:
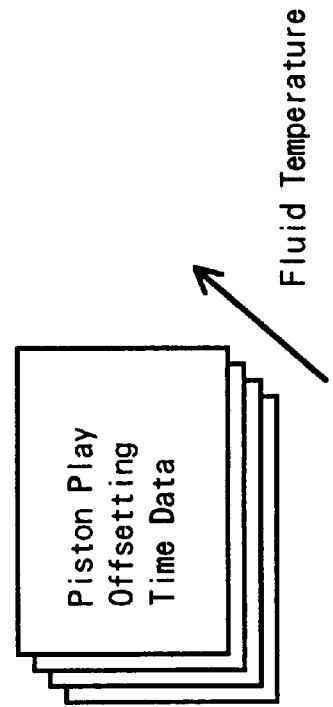
FIG. 7 is a table illustrating the learning of oil temperatures.

The lag time including the piston play offsetting time may be more precisely set by learning in relation to a value corresponding to the oil viscous resistance, for example, oil temperature, as shown in FIG. 7. That is, the values T1, ... of the lag time between the shift determination and the shift start are pre-set corresponding to different oil temperature ranges, for example, 0 to 80 degrees, 80 to 100 degrees, 100 to 120 degrees, and stored as initial values in the memory. The first coasting downshift is performed on the basis of the initial value corresponding to the current oil temperature, and the lag time values T2, T3, ... that are actually learned for the subsequent coasting downshifts and stored as data corresponding to the oil temperature ranges. Then the lag time T1 is determined based on an accumulated mean value. For example, the lag time T1 for the fifth coasting downshift is determined based on the mean value of the second, third and the fourth lag time values. The lag time including the piston play offsetting time is thus learned and is constantly updated.

It is also possible to store the piston play offsetting time values corresponding to the oil temperature ranges, as in the case of the lag time initial values, in a memory such as a flash ROM or an EEPROM, so that the coasting downshift control is performed on the basis of the piston play offsetting time values set corresponding to the oil temperature ranges, without learning.

Figure 8:
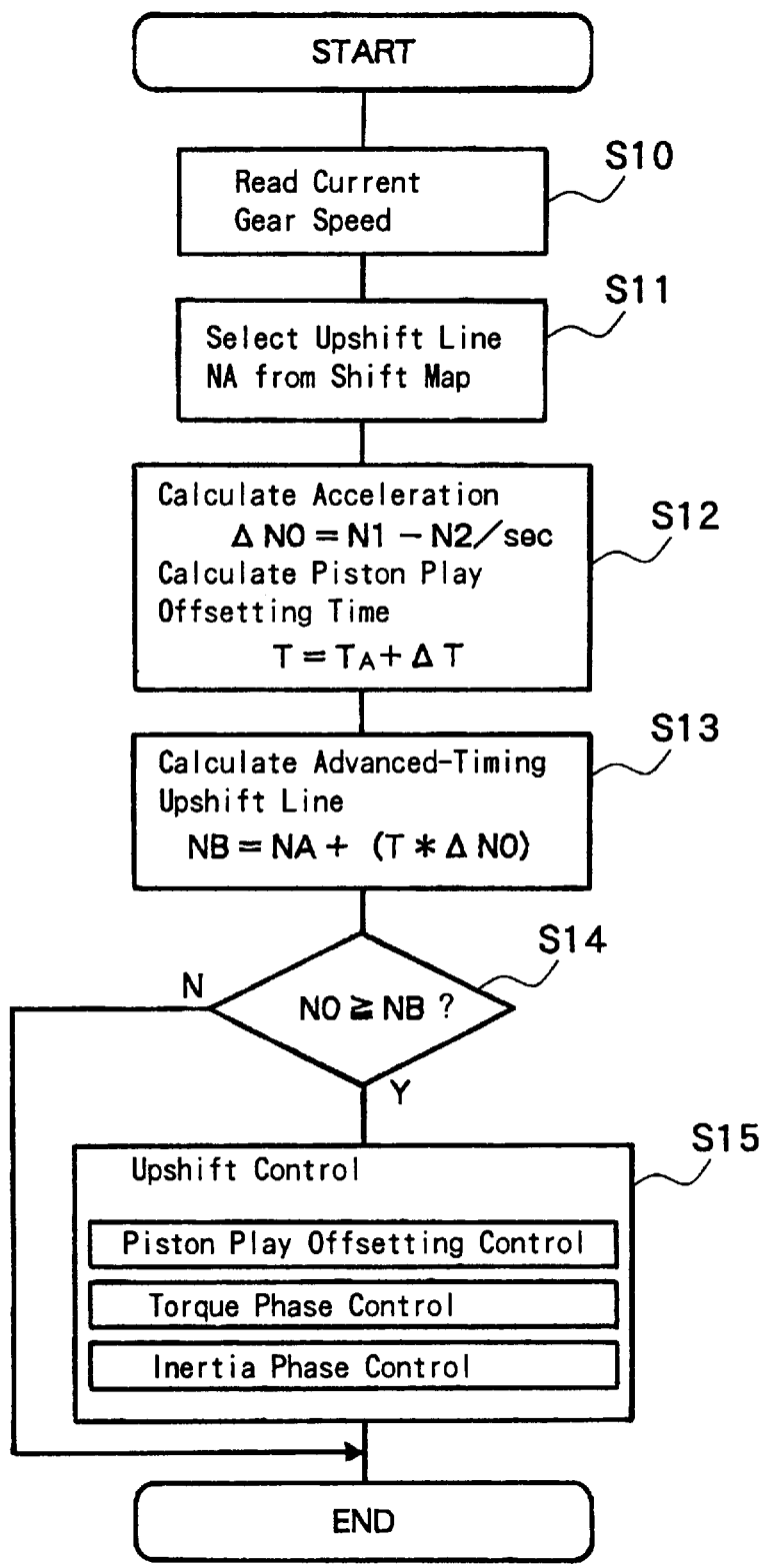
FIG. 8 is a flowchart of a control routine for a high-speed upshift.
Figure 9:
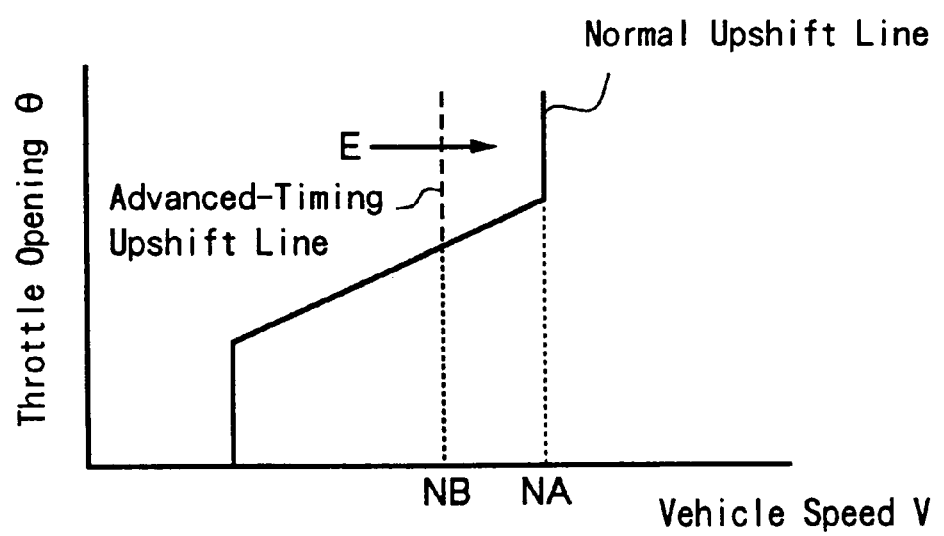
FIG. 9 illustrates a portion of a shift map used in the control routine illustrated in FIG. 8.
Figure 10:
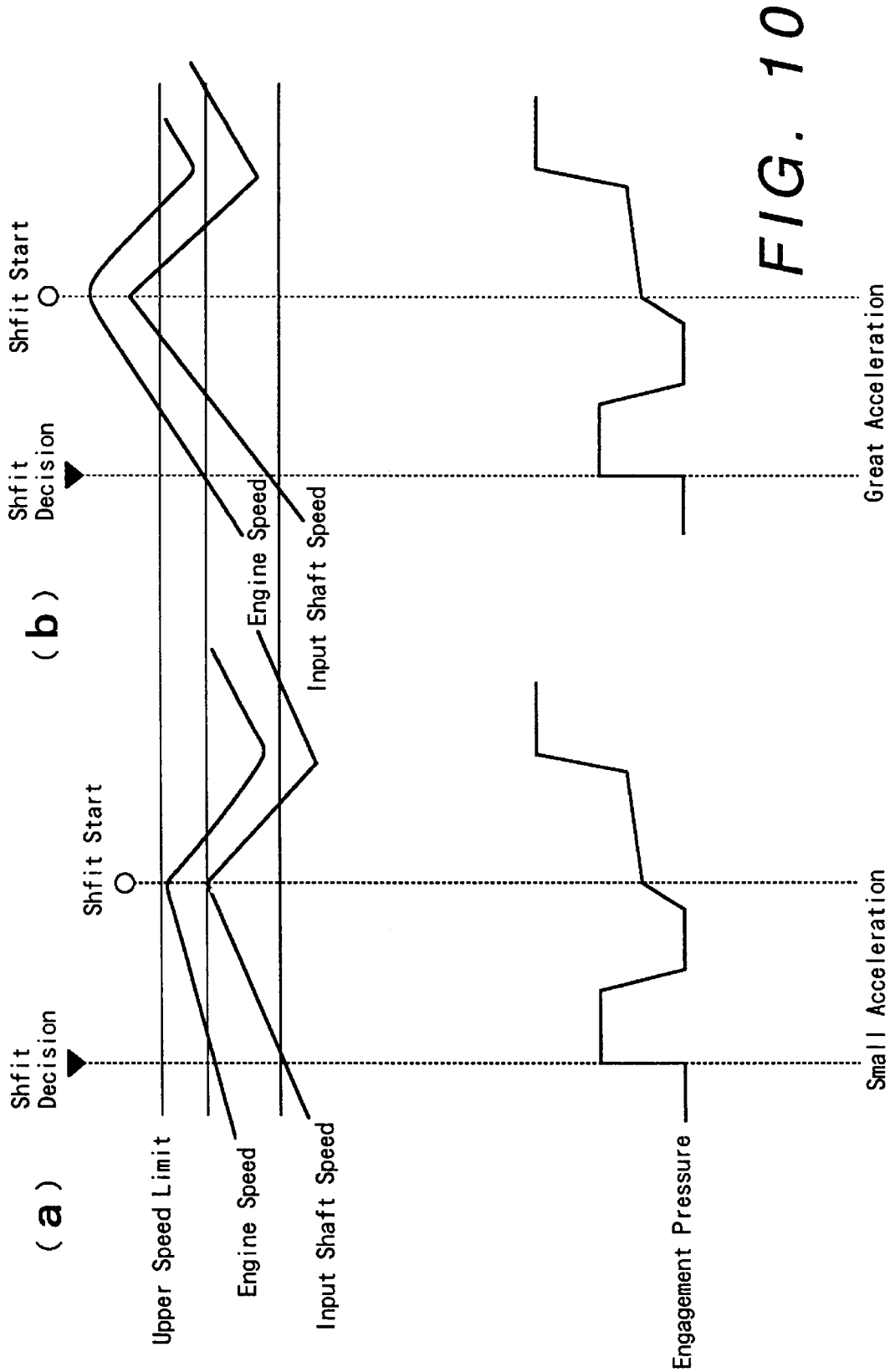
FIGS. 10a and 10b are graphs of speeds and servo pressures versus time in a high-speed upshift.

The control for an upshift during acceleration from a high speed will now be described with reference to FIGS. 8 through 10. As shown in the flowchart of FIG. 8, the high-speed upshift control starts with reading the current gear speed (for example, the 4th speed) (S10). The control unit 1 then selects an upshift line NA (for example, the 4th-5th upshift line) from a shift map (S11). The control unit then calculates a rate of acceleration (output shaft speed change) ΔN0 from the difference between the detected value N1 from the output shaft speed sensor 6 and the output shaft speed N2 occurring a predetermined time before (for example, one cycle before) (ΔN0=N1−N2/sec) (S12). Also, as in the above-described embodiment, the control unit 1 calculates a piston play offsetting time T based on the length of time $T_A$ for the piston play offsetting control (1), specific to each individual automatic shift mechanism, and a correction value ΔT corresponding to the time elapsing between the shift decision and the end of the torque phase of the previous upshift (T=$T_A$+ΔT) (S12).

Then, the control unit 1 calculates vehicle speed (output shaft speed) NB based on (1) an advanced-timing upshift line calculated from the vehicle speed NA, in turn, based on the normal upshift line from the shift map, (2) the piston play offsetting time T and (3) the rate of acceleration ΔN0 ( (NB=NA+(T×ΔN0)) (S13). If the output shaft speed NO detected by the vehicle speed sensor 6 becomes higher than the output shaft speed NB based on the advanced-timing upshift line (S14), that is, crosses the advanced-timing upshift line as indicated by arrow E in FIG. 9, the upshift control is performed (S15). The upshift control is performed by, for example, engaging the second clutch (C2) and releasing the second brake (B2) to release the first one-way clutch (F1). The engaging oil pressure is controlled by the piston play offsetting control, the torque phase control and the inertia phase control as described above.

If the rate of acceleration is low during the upshift control as shown in FIG. 10a, the increase of the engine speed and the increase of the input shaft speed are also low, and the engine speed and the input shaft speed decrease when the shift starts (the inertia phase starts). Thus the engine speed will not exceed an allowable rotary speed (upper limit). Conversely, if the acceleration is high as shown in FIG. 10b, the increases of the engine speed and the input shaft speed are also high. Therefore, if a shift determination is made based on the normal upshift line NA, the upshift, which actually starts after the lag time T1 including the piston play offsetting time T and the torque phase control time, may fail to achieve a speed reduction in time. That is, the engine speed (and the input shaft speed) may exceed the upper limit of the permissible range.

To avoid such an incident (wherein the engine speed rises above the allowable rotary speed range), the advanced-timing upshift line NB is set such that the shift decision is made earlier (at a relatively low vehicle speed) in accordance with the acceleration. Thereby, despite the response lag of the lag time T1, the upshift is accomplished while the engine speed remains within the allowable rotary speed range at the time of the start of the shift (at the target timing). It should be apparent that the piston play offsetting time T may be set based on learning or based on oil temperature as in the above-described embodiment.

Figure 11:
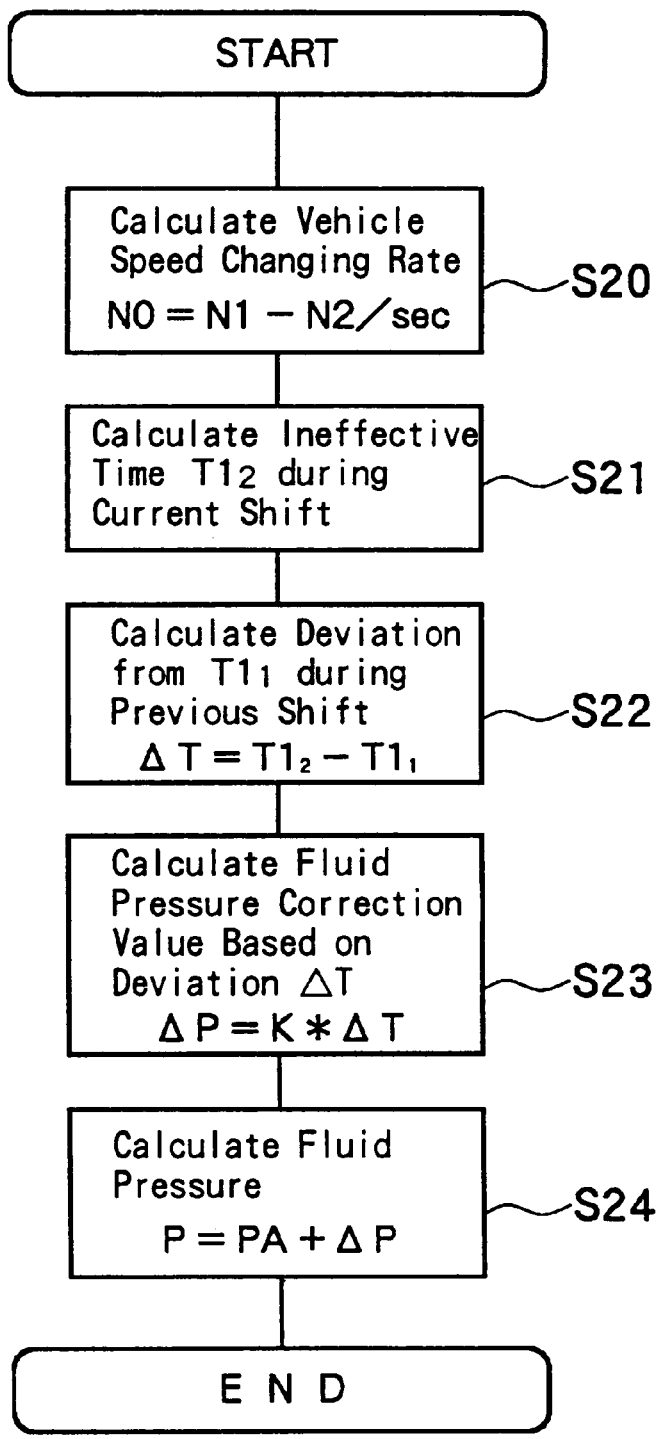
FIG. 11 is a flowchart of a control routine wherein the shift determination timing is fixed and the oil pressure supply is changed.

Although the above embodiments make a shift decision earlier by advancing the shift line in time to compensate for the lag time T1 including the piston play offsetting time T and the like, the ineffective time may be changed whereas the shift determination timing remains unchanged according to the embodiment shown in FIG. 11. As in the above embodiments, the control unit 1 first calculates a vehicle speed changing rate (deceleration or acceleration) ΔN0 from the difference between the current output shaft speed N1 as detected by the vehicle speed sensor 6 and the output shaft speed N2 occurring a predetermined time before (S20)

Based on the vehicle speed changing rate, the control unit 1 calculates the lag time $T1_2$ that elapses between the current shift decision and the start of the shift (S21). The control unit 1 also calculates a deviation $\Delta T$ between the previous lag time $T1_1$ and the currently calculated lag time $T1_2$ ($\Delta T = T1_2 - T1$) (S21).

Then, the control unit 1 calculates an oil pressure correction value $\Delta P$ for the piston play offsetting operation during the current shift, from the deviation $\Delta T$ and a coefficient K ($\Delta P = K \times \Delta T$) (S22). An oil pressure P for offsetting the piston play during the current shift is calculated from the oil pressure $P_A$ for the previous shift and the correction value $\Delta P$ ($P = P_A + \Delta P$) (S23). Thereby, for example, if the deceleration or acceleration is high, the control unit 1 sets a high oil pressure P in accordance with the deceleration (or acceleration) to speed up the piston play offsetting operation so that the shift will start at the target timing even though the shift decision is made according to the shift map.

While the invention has been described with reference to what are presently considered to be preferred embodiments thereof, it is to be understood that the invention is not limited to the disclosed embodiments. On the contrary, the invention is intended to cover various modifications and equivalent arrangements included within the spirit and scope of the appended claims.

What is claimed is:

1. A hydraulic control apparatus for an automatic transmission which receives torque from an engine at an input shaft, said control apparatus comprising:

an engine speed sensor for detecting speed of the engine and for generating an engine speed detection signal;

a transmission input shaft speed sensor for detecting speed of the transmission input shaft and for generating an input shaft speed detection signal;

a throttle opening sensor for detecting engine throttle opening and for generating a throttle opening detection signal;

a vehicle speed sensor for detecting vehicle speed and for generating vehicle speed detection signals;

a hydraulic circuit for supplying oil pressure to at least one servo for operation of a frictional engagement element in the transmission responsive to a shift decision;

a memory;

a shift map stored in said memory and correlating throttle opening with vehicle speed, said shift map having downshift lines for instructing start of a downshift;

main control means for receiving the detection signals, for plotting values for throttle opening and vehicle speed corresponding to said detection signals relative to said map, for comparing the detected engine speed with the detected input shaft speed, for making the shift decision in a normal control mode when the detected engine speed is not lower than the input shaft speed and for making the shift decision in a lag time control mode if the detected engine speed is lower than the detected input shaft speed, wherein said normal control mode decides start of a downshift when the plot crosses a predetermined downshift line and wherein said lag time control mode decides start of a downshift when the plot crosses a corrected downshift line obtained by correction of said predetermined downshift line, said main control means comprising:

speed change rate calculating means for calculating a rate of deceleration based on the detection signals from said vehicle speed sensor; and lag time control means for correcting said predetermined downshift line in accordance with (1) a predetermined piston play offsetting time corresponding to piston play in the one hydraulic servo and (2) the calculated rate of deceleration, to obtain said corrected downshift line.

2. A hydraulic control apparatus according to claim 1 wherein said lag time control means determines the actual piston play offsetting time and, based on the actual piston play offsetting time, updates the predetermined piston play offsetting time to a value for use in the next subsequent downshift.

3. A hydraulic control apparatus according to claim 2 wherein said actual piston play offsetting time is determined as the actual time interval between an actual shift decision and initiation of a rise in the oil pressure supplied to said one servo, responsive to the actual shift decision.

4. A hydraulic control apparatus according to claim 1:

wherein said shift map additionally has upshift lines for deciding an upshift; and wherein said speed rate change calculating means calculates a rate of acceleration based on the detection signals from said vehicle speed sensor, and said lag time control means corrects a predetermined upshift line based on the calculated rate of acceleration and the piston play offsetting time and said main control means decides an upshift when the plot crosses the corrected upshift line.

5. A hydraulic control apparatus according to claim 1 wherein said predetermined piston play offsetting time is a learned value.

6. A hydraulic control apparatus according to claim 4 wherein said piston play offsetting time is a learned value.

7. A method for controlling a downshift of an automatic transmission mounted in a vehicle powered by an engine, said method comprising:

detecting speed of the vehicle;

calculating a rate of deceleration based on values for detected vehicle speed;

detecting throttle opening of the engine;

plotting the detected vehicle speed and throttle opening on a map for vehicle speed versus throttle opening having predetermined downshift lines for deciding start of a downshift;

initiating a downshift by supply of oil pressure to a hydraulic servo operating a frictional engagement element in the automatic transmission, responsive to a shift decision signal;

determining if the vehicle is in a coasting state or a non-coasting state;

if the vehicle is in a non-coasting state, generating the shift decision signal responsive to said plot crossing one of said predetermined downshift lines; and if the vehicle is in a coasting state, correcting said one predetermined downshift line in accordance with the calculated rate of deceleration and a predetermined piston play offsetting time to obtain a corrected downshift line and generating the shift decision signal responsive to said plot crossing the corrected downshift line.

8. A method according to claim 7 further comprising determining actual piston play offsetting time as a time interval between generation of the shift decision signal and start of increase of oil pressure to the hydraulic servo.

9. A method according to claim 7 further comprising detecting an output speed for the engine and an input speed for the transmission;

and wherein said coasting state is determined when said input speed exceeds said output speed.

10. A method for controlling a shift in an automatic transmission mounted in a vehicle powered by an engine, said method comprising:

detecting speed of the vehicle;

calculating a vehicle speed changing rate based on values for detected vehicle speed;

detecting throttle opening of the engine;

plotting the detected vehicle speed and throttle opening on a map for vehicle speed versus throttle opening, said map having predetermined shift lines for deciding start of a shift; and correcting one of said predetermined shift lines in accordance with the calculated vehicle speed changing rate and generating a shift decision signal responsive to said plot crossing the corrected shift line.

11. A method according to claim 10 wherein said predetermined shift lines are predetermined upshift lines for deciding start of an upshift.

12. A method according to claim 10 further comprising further correcting said one predetermined shift line in accordance with a piston play offsetting time.

13. A method according to claim 12 further comprising determining the piston play offsetting time as an actual time interval between generation of the shift decision signal and start of increase of oil pressure to the hydraulic servo.

14. A method according to claim 12 wherein the piston play offsetting time is a predetermined value.

15. A method according to claim 12, further comprising correcting the piston play offsetting time on the basis of a value for piston play offsetting time learned from at least one previous shift.

16. A method according to claim 12, wherein the piston play offsetting time is set by learning based on data for actual piston play offsetting times accumulated in previous speed shifts.

17. A method according to any claim 12, wherein the piston play offsetting time is set based on data values corresponding to various values for oil viscous resistance.

18. A method according to claim 17, wherein said data values corresponding to oil viscous resistance are values for oil temperatures.

19. A method for controlling a downshift in an automatic transmission mounted in a vehicle powered by an engine, said method comprising:

detecting speed of the vehicle;

calculating a vehicle speed changing rate based on values for detected vehicle speed;

detecting throttle opening of the engine;

plotting the detected vehicle speed and throttle opening on a map for vehicle speed versus throttle opening, said map having predetermined downshift lines for deciding start of a downshift;

determining if the vehicle is in a coasting state or a non-coasting state;

if the vehicle is determined to be in a non-coasting state, generating a shift decision signal responsive to said plot crossing one of said predetermined downshift lines; and if the vehicle is determined to be in a coasting state, correcting said one predetermined downshift line in accordance with the calculated vehicle speed changing rate and generating a shift decision signal responsive to said plot crossing the corrected downshift line.

20. A method according to claim 19 further comprising: detecting an output speed for the engine and an input speed for the transmission and wherein said coasting state is determined when said input speed exceeds said output speed.

21. An apparatus for controlling a shift in an automatic transmission mounted in a vehicle powered by an engine, said apparatus comprising:

a speed detector for detecting speed of the vehicle;

calculating means for calculating a vehicle speed changing rate based on values for detected vehicle speed;

a throttle detector for detecting throttle opening of the engine;

a memory containing a map for vehicle speed versus throttle opening, said map having predetermined shift lines for deciding start of a shift;

means for plotting the detected vehicle speed and detected throttle opening on said map; and shift line correction means for correcting one of said predetermined shift lines in accordance with the calculated vehicle speed changing rate and generating a shift decision signal responsive to said plot crossing the corrected shift line.

22. An apparatus according to claim 21 wherein said predetermined shift lines are predetermined upshift lines for deciding start of an upshift.

23. An apparatus according to claim 21 wherein said shift line correction means further corrects said one predetermined shift line in accordance with a piston play offsetting time.

24. An apparatus in accordance with claim 23 further comprising means for determining said piston play offsetting time as an actual time interval between generation of the shift decision signal and start of increase of oil pressure to a hydraulic servo.

25. An apparatus according to claim 23 wherein said piston play offsetting time is a predetermined value stored in memory.

26. An apparatus according to claim 23 further comprising learning means for learning the piston play offsetting time.

27. An apparatus according to claim 26 wherein said learning means accumulates values for actual piston play offsetting times for plural shifts.

28. An apparatus according to claim 23 wherein said memory further contains values for piston play offsetting times correlated with various values corresponding to oil viscous resistance.

29. An apparatus according to claim 28 wherein said values corresponding to oil viscous resistance are values for oil temperature.

30. An apparatus for controlling a downshift in an automatic transmission mounted in a vehicle powered by an engine, said apparatus comprising:

a speed detector for detecting speed of the vehicle;

calculating means for calculating a vehicle speed changing rate based on values for detected vehicle speed;

a throttle detector for detecting throttle opening of the engine;

a memory containing a map for vehicle speed versus throttle opening, said map having predetermined shift lines for deciding start of a shift;

means for plotting the detected vehicle speed and throttle opening on said map;

coasting determination means for determining if the vehicle is in a coasting state or a non-coasting state;

a control unit for, if the vehicle is determined to be in a non-coasting state, generating a shift decision signal responsive to said plot crossing one of said predetermined downshift line and for, if the vehicle is determined to be in a coasting state, correcting said one predetermined downshift line in accordance with the calculated vehicle speed changing rate and generating a shift decision signal responsive to said plot crossing the corrected downshift line.

31. An apparatus according to claim 30 further comprising:

means for detecting an output speed for the engine and an input speed for the transmission and wherein said coasting state is determined when said input speed exceeds said output speed.

* * * * *

UNITED STATES PATENT AND TRADEMARK OFFICE
CERTIFICATE OF CORRECTION

PATENT NO. : 5,954,776
DATED : September 21, 1999
INVENTOR(S) : SAITO et al

It is certified that error appears in the above-identified patent and that said Letters Patent is hereby corrected as shown below:

ON THE FACE OF THE PATENT, under the heading References Cited, please follow "5,267,491 12/1993 Sumimoto et al.........477/155" with subheading --FOREIGN PATENTS--; and under that subheading insert --8,248,397 9/19/1996 JAPAN--.

Col. 9, line 6, "$Tl_2 - T1$" should read --$Tl_2 - Tl_1$--.

Col. 11, line 40, the word "any" should be omitted from the sentence.

Signed and Sealed this

Tenth Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 5,954,776
DATED : September 21, 1999
INVENTOR(S) : Saito et al.

Page 1 of 1

It is certified that error appears in the above-identified patent and that said Letters Patent is hereby corrected as shown below:

Title page,
After "Filed -- Aug. 12, 1997", insert: -- Foreign Application Priority Data
Sept. 19, 1996 [JP] Japan 8-248397 -- .

Column 9,
Line 6, "$T1_2$-T1" should read -- $T1_2 - T1_1$ -- .

Column 11,
Line 40, the word "any" should be omitted from the sentence.

Signed and Sealed this

Twentieth Day of November, 2001

*Attest:*

NICHOLAS P. GODICI
*Attesting Officer*   *Acting Director of the United States Patent and Trademark Office*